Patented Nov. 1, 1932

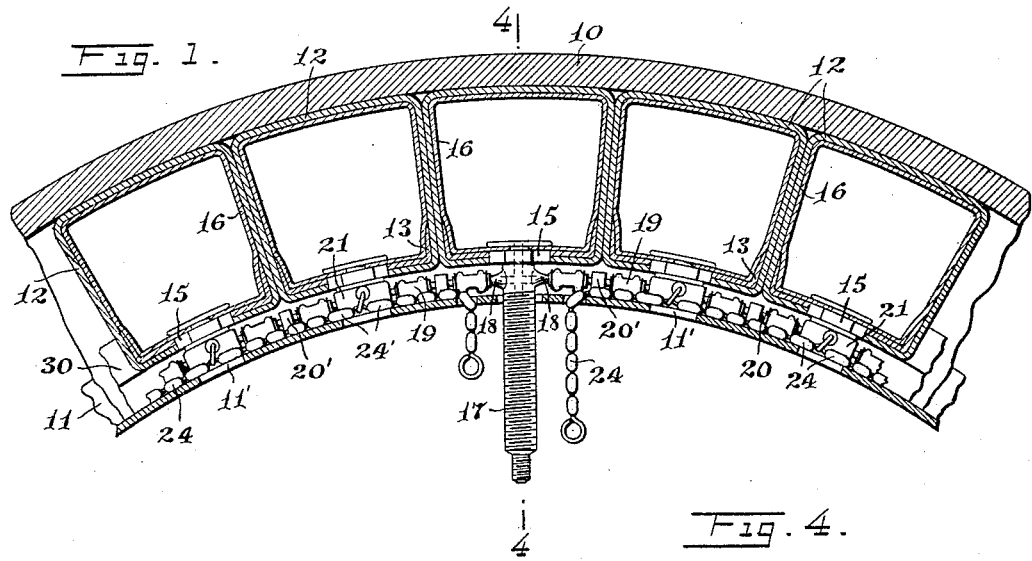
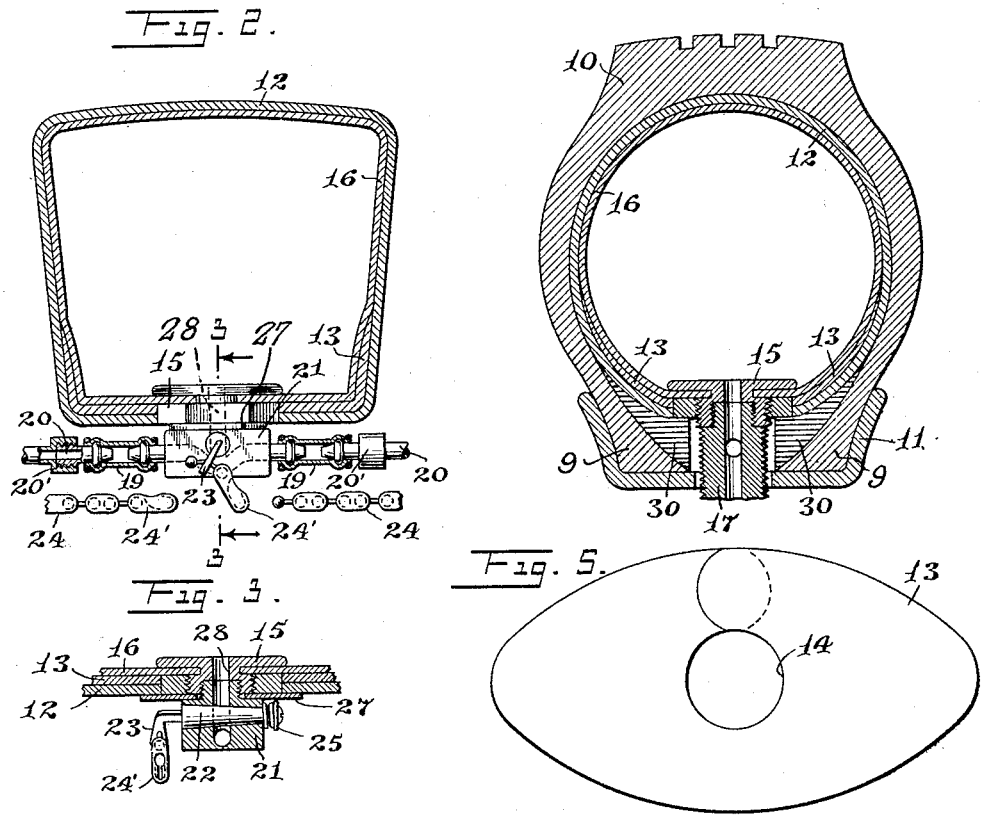

1,886,094

UNITED STATES PATENT OFFICE

JOSÉ LEANDRO MONTALVO GUENARD, OF PONCE, PUERTO RICO

PNEUMATIC TIRE

Application filed December 16, 1929. Serial No. 414,513.

This invention relates to pneumatic tires.

It is among the objects of the present invention to provide an improved pneumatic tire which includes a plurality of separately encased inflatable sections which cooperate in forming a unitary pneumatic tire, any one section of which may be removed for repair and replaced by a similar section, without discarding the entire tire or the remaining inner tube sections.

A further object of the present invention is to provide a pneumatic tire including a plurality of individual inflatable sections together with a single means for inflating simultaneously all of said sections.

A further object of the present invention is to provide an inner tube for pneumatic tires including a plurality of separately inflatable sections, each of such sections including a valve for controlling the inflation thereof, together with a single means for simultaneously operating a plurality of such valves.

A further object of the present invention is to provide a pneumatic tire including a plurality of separately protected, removable inflatable sections.

A further object of the present invention is to provide a tire assembly including a plurality of individual inflatable sections, together with means extending to the outside of the tire rim for controlling the air pressure of said sections.

A further object of the present invention includes the novel combination and interrelation of parts whereby a simple and efficient sectional pneumatic tire is provided.

Further objects and features of the present invention will be apparent from a consideration of the following specification taken in conjunction with the accompanying drawing, in which Figure 1 is a longitudinal sectional view through one form of the present invention;

Fig. 2 is a vertical section through that form of the invention shown in Fig. 1;

Fig. 3 is a sectional view taken on lines 3—3 of Fig. 2;

Fig. 4 is a transverse section taken on line 4—4 of Fig. 1;

Fig. 5 is a detail view of a protecting flap adapted to be inserted between the inflatable section and its individual receiving unit;

Fig. 6 is a detail view of a protecting washer for the valve assembly of the device.

Referring more particularly to the drawing, the invention is adapted for use in various types of conventional vehicle tires, the tire being indicated at 10 in Fig. 1, it being understood, however, that the invention is subject to various modifications by which the inflatable assemblies are adapted for various types of tire casings.

The tire 10 has the usual beads 9 which are received by a conventional form of rim 11. The rim 11 is apertured in the conventional manner to provide access therethrough for a valve stem and is further apertured to receive therethrough the extremities of an operating chain as will be hereinafter described. The rim further includes apertures 11' provided for the manual manipulation of the valves as will be hereinafter described. Within the tire 10, a plurality of individual casings 12 are provided, each of which is open at its lower end and is provided with proper closing means and a protecting flap 13 as illustrated in Fig. 5. One side of each flap 13 is cut to provide for the positioning of the flap with its central aperture 14 embracing a valve bottom securing nut 15 of an inner inflatable section 16. The section 16 and the casing 12 are adapted to conform in configuration with each other and with associated sections whereby they may be grouped together to provide an internal annular sectional inner tube for the tire 10. Associated with the valve bottom and securing nut 15 of one of the sections 16, a conventional valve stem 17 is provided, by which that section may be inflated. The valve stem 17 further includes at right angles with its long axis, two oppositely extending nipples 18 which communicate by joining tubes 19 with intermediate nipples 20 and unions 20', by which the valve assemblies of the other sections are connected with the valve stem 17, so that when the valves of the various sections are open, all of the sections may be simultaneously inflated or deflated through the valve stem 17. The valve assemblies of the remaining sections include flat valve bodies 21 having a three-way passage 28 controllable by rotatable apertured valve plugs 22, each of which extends beyond the valve body and terminates in an angularly disposed operating arm 23, which arm is engageable with a valve-operating flexible element such as chain 24, the ends of which extend through the rim for external manipulation, as hereinbefore described. The valve plug 22 is further provided with a spring 25 which engages the plug and the valve body for normally retaining the plug in closed position. As shown in Fig. 2, each side of the valve body communicates by the tube 19, with the valve assembly of the next adjacent section on each side. The chain 24 extends between the inflatable sections and the rim and engages each of the arms 23, permitting the valve plugs 22 under the influence of the springs 25 to assume closed positions, but being adapted to actuate the plugs to move them to opened positions against the action of the springs 25 whereby communication between the sections 16 and the passages of the valve bodies 17 is established. The chain 24 preferably includes suitable detachable connecting links 24', which may be readily detached to insert or remove one or more of the chain sections whereby the length of the chain may be varied and whereby the chain may be removed. In this connection it will be noted that the rim 11 is provided with suitable apertures 11' as hereinbefore mentioned, which register with the valve bodies 21, whereby manual operation of the valve plugs 22 is provided for emergency, through the apertures 11'. The valve assemblies further include a hinged oval washer 27, which is adapted to fit between the nut 15 and the valve body 21, whereby inflation of the section will not permit the section to expand to an extent to interfere with the movements of the valve plug 22 or the chain 24. In order to prevent the expansion of the sections in such manner as to interfere with the connecting tubings, nipples, operating chains, valves, and the like, a pair of annular sections 30 are provided, as shown in Fig. 4, which sections lie on either side of the valves, their outer edges abutting the inner face of the outer tire, while their inner faces maintain the inflated sections in spaced relation to the rim to provide at all times proper space for the manipulation of the chain or the like. It will be understood that the sections 30 are cut out adjacent the valves to properly receive the valves therethrough, thus to provide for the operation of the valve and for the protection of the connecting tubes.

In the operation of the present invention, should a puncture be received in one of the sections and the air escape therefrom, the valves will be in their normally closed position and air from the next adjacent section will not escape through the puncture of the first section, but the next adjacent sections, due to their inflation above atmospheric pressure, will tend to expand a little to fill up somewhat the place of the deflated section, and the normal efficiency of the tire will not be interfered with.

When it is desired to remove one of the sections for discard or for repair, the entire tire is deflated as usual, by movement of the operating chain 24, and by the operation of the valve within the valve stem 17. The tire is then removed from the rim, which may be of conventional form and the chain is disconnected from the section which it is desired to remove. The unions 20' on both sides of the joining tube 19 of that section are then disconnected and a new section may be placed in its stead and connected again by the unions 20' and associated with the chain. After the reassembling of the tire with the new section, the same is set again on the rim, then the valves are opened by movement of the chain around the rim, which by engagement of the extending ends 23 of the valve, rotates the valve plug to aline its aperture with the passage 28 of the valve body, whereby upon applying air under pressure to the valve stem 17, all the sections will be simultaneously and equally inflated.

It will be noted that the valve bottoms of both types of valves are interchangeable so that the stem 17 may be connected with any one of the valve bodies or the valve body may be associated with the valve plug 22. It will further be seen, as illustrated in Figs. 1 and 2 at 24', that detachable securing links in the chain are provided, so that the chain may be disconnected or adjusted should occasion require.

From the foregoing, it will readily be seen that the invention provides a novel, simple and improved sectional tire, the sections of which are separately encased for protection thereof and which may be simultaneously inflated or deflated, or kept separately inflated, when desired. It will be understood that the present invention is not confined to the specific structural details herein presented, but that numerous changes, modifications, and the full use of equivalents may be resorted to without departing from the spirit or scope of the invention as outlined in the appended claims.

What is claimed is:

1. In combination with a tire body, a plurality of individual casings, an inflatable section within each of said casings, one of said sections having a valve stem with a bore and two laterally disposed nipples communicating with said bore, extending beyond its casing, the remaining sections having valve bodies extending beyond said sections, each of said bodies having a head and a securing nut for securing said body to its section, a flap between said sections and their casings, protecting washers between said nuts and said valve bodies to prevent interference of said valve bodies by said casings, the valve bodies each having a transversely extending rotatable valve plug and an operating arm therefor, and jointed connections establishing an air line between said bodies and said nipples.

2. In combination with a tire body, a plurality of individual casings, an inflatable section within each of said casings, one of said sections having a special valve stem with a main bore and two laterally disposed nipples communicating with said bore, extending beyond its casing, the remaining sections having valves each including a body, each of said valve bodies having a head and a securing nut for securing said valve bodies to its section, a flap between said sections and their casings, protecting washers between said nuts and said valve bodies to prevent interference with said valve bodies by said casings, the valve bodies each having a transversely extending rotatable valve plug and an operating arm therefor, and a chain connected with said arm for simultaneously operating said valve plugs for opening and closing said valves.

3. In combination with a tire body, a plurality of individual casings, an inflatable section within each of said casings, one of said sections having a special valve stem with a main bore and two laterally disposed nipples communicating with said bore, extending beyond its casing, the remaining sections having valves each including a body, each of said valve bodies having a head and a securing nut for securing said valve bodies to its section, a flap between said sections and their casings, protecting washers between said nuts and said valve bodies to prevent interference with said valve bodies by said casings, the valve bodies each having a transversely extending rotatable valve plug and an operating arm therefor, a chain connected with said arm for simultaneously operating said valve plugs for opening and closing said valves, and means constantly acting on each plug to move it to a normally closed position.

4. A pneumatic tire having the combination of an annular series of inflatable sections, one of said sections having a valve stem with a main bore and two laterally disposed nipples communicating with said bore, the remaining inflatable sections each having a valve including a body provided with means for securing the body to the related section, a rotatable valve plug extending transversely of said body and provided with an operating arm, a flexible element connected with the arm, whereby to operate the plugs to simultaneously open and close said valves, and connections establishing an air line between said nipples and all of said valves.

5. A pneumatic tire having the combination of a plurality of inflatable sections, valves for inflating said sections, means which establishes an air line between said valves, said means including insertable and removable sections to increase or decrease the length thereof, and a flexible element connected with said valves to open and close them, said flexible element having insertable and removable parts to increase or decrease the length thereof.

JOSÉ LEANDRO MONTALVO GUENARD.